Patented Aug. 6, 1946

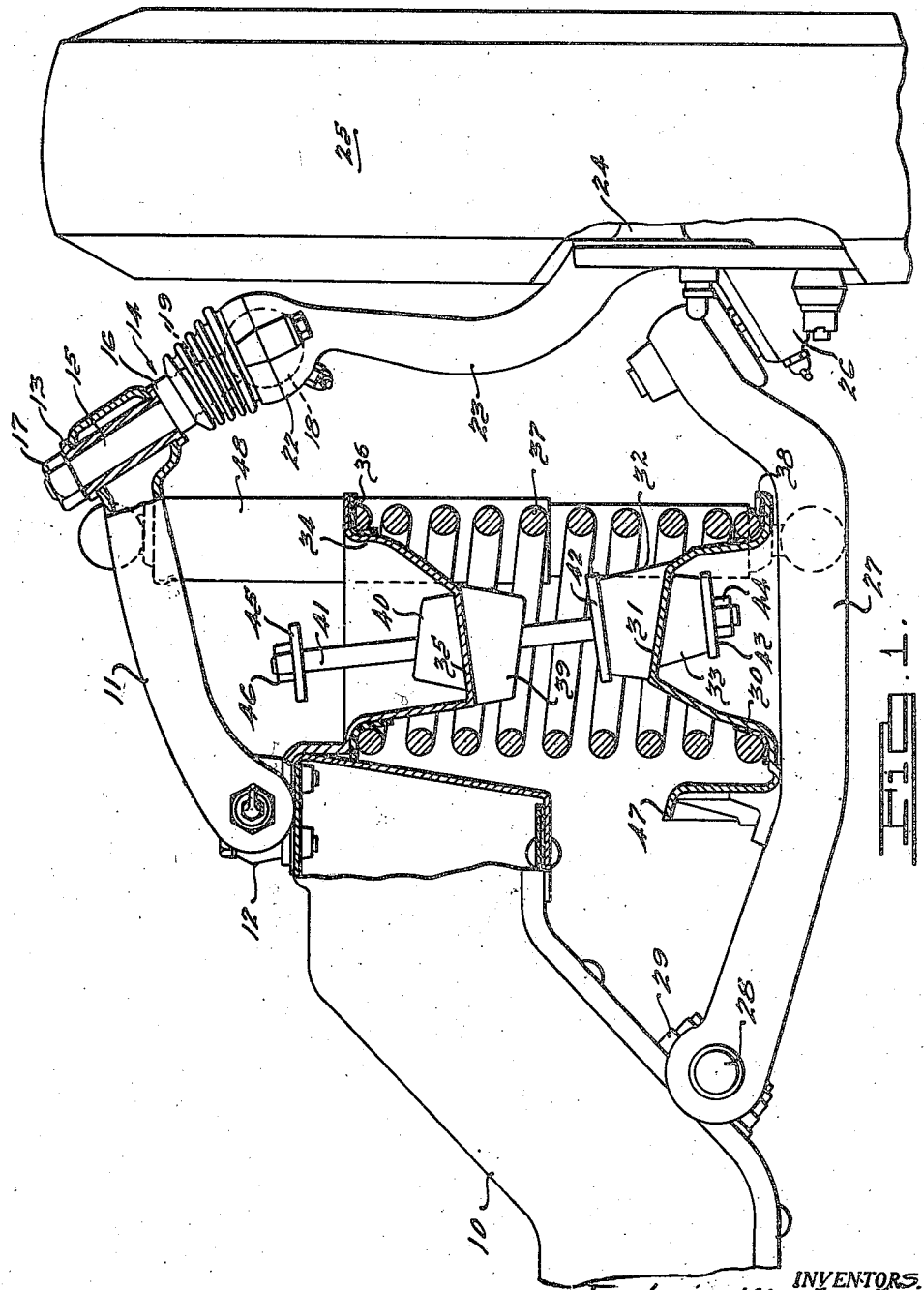

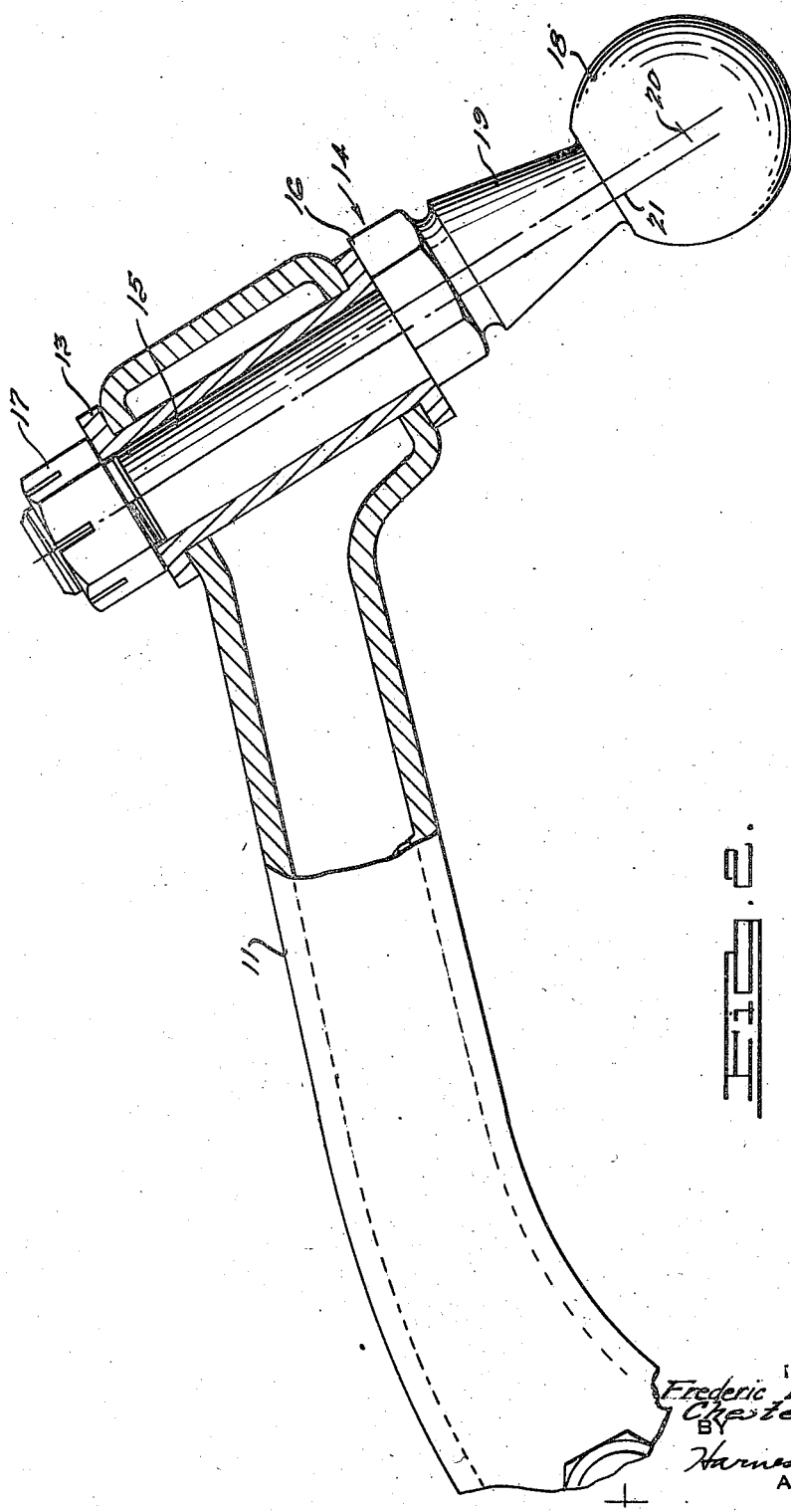

2,405,458

UNITED STATES PATENT OFFICE 2,405,458

VEHICLE WHEEL CONNECTING JOINT

Frederic W. Slack, Detroit, and Chester C. Utz, Magnolia, Mich., assignors to Chrysler Corporation, Highland Park, Mich., a corporation of Delaware Application February 19, 1945, Serial No. 578,664

6 Claims. (Cl. 280—96.2)

This invention relates to a means for adjusting the condition of a steerable wheel connected to a vehicle frame for movement with respect thereto. More specifically it relates to the adjustment of a ball member in a universal joint included in the connection of a steerable wheel to a vehicle frame by means of links.

In steerable-wheel suspensions involving links tying a vehicle frame and the steerable wheel with universal joints between the links and a wheel-carrying member, it is frequently the practice to provide a ball-carrying part forming part of one universal joint with an adjustment for varying the camber and/or caster of the steerable wheel. We have devised a ball-carrying part of a special design and mounted it in a special way so that the above variation of camber and/or caster may be conveniently and easily obtained.

An object of the present invention is to provide an improved suspension for a vehicle frame on a steerable wheel. This suspension may involve links between the vehicle frame and a carrying part for the steerable wheel and a universal joint connecting the links and the carrying part.

Another object is to improve a construction involving a link connecting a part and a frame with a universal joint between the link and the part.

A further object is to provide an adjustment in the connection of a steerable wheel to a vehicle frame for varying the camber and/or caster of the wheel.

Other objects will appear from the disclosure.

In the drawing:

Fig. 1 is a fragmentary view partially in section showing the connection of a steerable wheel to a vehicle frame; and Fig. 2 is a view of a link and an associated part employed in the connection of the steerable wheel to the vehicle frame.

The reference character 10 designates a vehicle frame, the front portion of which is shown in Fig. 1. An upper link 11 is pivotally connected at one end by a bracket structure 12 to the vehicle frame 10. This one end of link 11 may be forked and comes on both sides of the bracket structure 12. The other end of the link 11 has an opening in which is secured a bushing 13 in any suitable manner such as by soldering or welding. A member 14 has a shank portion 15 in the bushing 13 and a shoulder 16 engaging one end of the bushing 13. A nut 17 on the shank portion 15 at the other end of the bushing 13 secures the member 14 to the bushing 13 against movement with respect thereto by pulling the shoulder 16 against the said one end of the bushing 13. The member 14 has a spherical or ball portion 18, which is joined to the shank portion by an intermediate portion 19. The center of the ball portion 18, indicated at 20, is displaced from the centerline of the shank portion 15 of the member 14, indicated at 21. The ball portion 18 is part of a universal joint 22, which includes a socket formed in the upper end of a part 23 and receiving the ball portion 18. The part 23 has a spindle 24 carrying a steerable front ground wheel 25. The lower end of the part 23 is connected by a universal joint 26 to one end of a lower link 27, the other end of which is connected at a pivot 28 to the vehicle frame 10 by means of a bracket structure 29. The said other end of the lower link 27 may be forked and in this event will come on both sides of the bracket structure 29.

A member 30 is secured to the link 27 and has a central portion 31 which is upwardly displaced from the link 27 and to which are bonded resilient bumpers 32 and 33, formed, for example, of a material such as rubber. A member 34 is secured to the vehicle frame 10 and has a central portion 35, displaced downwardly toward the member 30, from a surrounding portion 36, serving as a seat for the upper end of a coil spring 37. The lower end of the spring 37 rests on a seat 38 formed on the member 30. Resilient bumpers 39 and 40 are bonded to the portion 35 of the member 34 and may be formed of a material such as rubber. A rod 41 extends through the resilient bumpers and the portions 31 and 35 of the members 30 and 34. A stop 42 secured to an intermediate portion of the rod 41 engages the bumper 32, and a stop 43, secured against a shoulder on the lower end of the rod 41 by a nut 44, engages the bumper 33. The stop 42 is adapted to engage the bumper 39 upon upward movement of the rod 41, caused by upward movement of the links 21 and 27. A stop 45, secured against a shoulder on the upper end of the link 41 by a nut 46, is adapted to engage the bumper 40 upon downward movement of the rod 41 due to downward movement of the links 11 and 27. The member 30 has an upstanding portion 47 adapted to strike the frame 10 upon sufficient upward movement of the links 11 and 27. The functions and operation of the members 30 and 34, the bumpers 32, 33, 39 and 40, and the stops 42, 43, and 45 on the rod 41 are more fully described and are claimed in the copending application of Slack and Utz, Serial No. 578,665, filed February 19, 1945.

A shock absorber 48 is connected at one end to the lower link 27 and at the other end to the vehicle frame 10 by means not shown, since the shock absorber does not directly form a part of the present invention.

As previously stated, the center of the ball portion 18 of the part 14 is offset from the axis of the shank portion 15, and the amount of the offset may be noted from the Fig. 2, in which the reference characters 20 and 21 respectively designate the center and centerline mentioned above. It is to be observed that the shank portion 15 of the part 14 extends through the outer end of the link 11 at a substantial angle in the neighborhood of a right angle to the general direction of the length of the link 11. Thus angular shifting of the part 14 about the axis of the shank portion 15 brings about an adjustment of the ball portion 18 along the general direction of the length of the link 11. Thus the distance between the ball portion 18 and the pivot of the link 11 on the vehicle frame 10, measured transversely of the vehicle frame, may be adjusted. This brings a transverse adjustment of the upper end of the part 23, causing an adjustment of the camber of the wheel 25. Since the center of the ball portion 18 moves in a circle about the axis of the shank portion 15, the ball portion 18 and the upper end of the part 23 are adjusted lengthwise of the vehicle frame 10. Thus the caster of the wheel 25 is adjusted.

We claim:

1. In an assembly comprising a vehicle frame, upper and lower links pivotally connected to the vehicle frame, a wheel-supporting part, and means forming a universal joint between the lower link and the wheel-supporting part, the combination of the wheel-supporting part and the upper link, of means forming a universal joint between the upper link and the wheel-supporting part, said means including a member having a shank portion normally fixedly secured to and extending through the upper link at a substantial angle to its length and a spherical portion having its center displaced from the axis of the shank portion and engaged by the wheel-supporting part, manual loosening of the member from the upper link making possible angular shifting of the member about the axis of the shank portion resulting in shifting of the spherical portion in the direction of the length of the upper link.

2. In an assembly comprising a vehicle frame, a link pivotally connected to the vehicle frame, and a wheel-carrying part, the combination with the link and the wheel-carrying part, of means for connecting them in a universal joint, said means including a member having a shank portion normally fixedly secured to the link and extending at a substantial angle thereto and a ball portion having a center displaced from the axis of the shank portion and being engaged by the wheel-supporting part, manual loosening of the member from the link making possible angular shifting of the member about the axis of the shank portion resulting in shifting of the ball portion in the direction of the length of the link.

3. In an assembly comprising a vehicle frame, a link part pivotally connected to the vehicle frame, and a wheel-carrying part, the combination with the aforesaid parts, of means for connecting them in a universal joint, said means including a member having a shank portion and a ball portion having a center displaced from the axis of the shank portion, the member and one part being normally fixedly secured to one another, manual loosening of the member from the said one part making possible angular shifting of the member about the axis of its shank portion resulting in shifting of the position of the ball portion with respect to the said one part and in change of the position of the end of the wheel-carrying part adjacent the link part in the direction of the length of the link part.

4. In an assembly comprising a vehicle frame, upper and lower link parts pivotally connected to the vehicle frame, a wheel-supporting part, and means forming a universal joint between the lower link part and the wheel-supporting part, the combination with the wheel-supporting part and the upper link part, of means forming a universal joint between these last mentioned parts, said means including a member having a shank portion and a ball portion having a center spaced from the axis of the shank portion, the member and one of the said last mentioned parts being normally fixedly secured to one another, manual loosening of the member from the said one of the last mentioned parts making possible angular shifting of the member about the axis of the shank portion resulting in adjustment of the position of the ball portion with respect to the said one of the last mentioned parts and in change of the position of the upper end of the wheel-supporting part in the direction of the length of the upper link part.

5. In an assembly comprising a vehicle frame, upper and lower links pivotally connected to the vehicle frame, and a wheel-carrying part connected in a universal joint to one link, the combination with the other link and the wheel-carrying part, of means connecting them in a universal joint, said means including a member having a shank portion and a ball portion having a center spaced from the axis of the shank portion, the member and the said other link being normally fixedly secured to one another, manual loosening of the member from the said other link making possible angular shifting of the member about its shank portion resulting in adjustment of the position of the ball portion in the direction of the length of the said other link.

6. In an assembly comprising a vehicle frame, upper and lower link parts pivotally connected to the vehicle frame, and a wheel-carrying part connected in a universal joint to one link part, the combination with the other link part and the wheel-carrying part, of means connecting the said last two parts in a universal joint, said means including a member having a shank portion and a ball portion having a center displaced from the axis of the shank portion, the member and one of the said last two parts being normally fixedly secured to one another, manual loosening of the member from the said one of the said last two parts making possible angular shifting of the member about the axis of the shank portion resulting in adjustment of the ball portion and in adjustment of the end of the wheel-carrying part adjacent the said other link in the direction of the length of the said other link.

FREDERIC W. SLACK.
CHESTER C. UTZ.